United States Patent [19]

Bolang et al.

[11] Patent Number: 4,863,122
[45] Date of Patent: Sep. 5, 1989

[54] AIRCRAFT RUDDER THERMAL COMPENSATION LINKAGE

[75] Inventors: Per A. Bolang, Belleview; Hugh R. Parkes, Woodinville, both of Wash.

[73] Assignee: The Boeing Company, Seattle, Wash.

[21] Appl. No.: 66,950

[22] Filed: Jun. 24, 1987

[51] Int. Cl.[4] ............................................. B64C 13/38
[52] U.S. Cl. ..................................... 244/221; 244/230; 74/501.5 R; 74/469
[58] Field of Search ................ 244/75 R, 76 R, 76 C, 244/220, 221, 226, 227, 230, 232; 74/501.5, 522, 525, 516, 489, 519; 60/39.32, 39.281, 39.283

[56] References Cited

U.S. PATENT DOCUMENTS

| | | | |
|---|---|---|---|
| 2,395,261 | 2/1946 | Findley | 74/501.5 |
| 2,899,152 | 8/1959 | Wieland | 244/226 |
| 3,236,478 | 2/1966 | Adams et al. | 244/76 C |
| 3,327,552 | 6/1967 | Broders et al. | 74/469 |
| 3,396,597 | 8/1968 | Dean | 244/221 |
| 3,478,990 | 11/1969 | Kaniuka | 244/226 |
| 4,243,189 | 1/1981 | Ohgi | 244/75 R |

Primary Examiner—Galen L. Barefoot
Attorney, Agent, or Firm—Dellett, Smith-Hill and Bedell

[57] ABSTRACT

A rudder control linkage having thermal compensation features employs a stationary thermal compensation rod, a lever with a fixed pivot, a reversing link with a movable pivot, a summing link, pilot and yaw damper input rods, and output rods. In an airplane having a fin and a rudder, the linkage is utilized to cancel undesired yaw inputs to the rudder caused by fin bending and differential thermal expansion which, if not corrected, would deleteriously affect airplane trim.

9 Claims, 5 Drawing Sheets

AIRCRAFT RUDDER THERMAL COMPENSATION LINKAGE

BACKGROUND OF THE INVENTION

The present invention relates in general to mechanical linkages and in particular to a rudder linkage with thermal compensation features utilized in an airplane fin to control the airplane's rudder.

During climb, the fin structure of a modern jet airplane cools more rapidly than the rudder control linkages inside the fin resulting in a rudder drift to the left or right depending upon the design of the linkages and the location of the linkage pivot points on the fin structure. To compensate, it has been necessary for the pilot to make frequent corrections during flight to lateral and directional trim. During cruise the fin structure and the control linkage inside eventually reaches the same temperature and corrections, opposite in direction to those applied during climb, are again necessary to maintain proper trim. Upon descent the fin structure warms up faster than the aforementioned linkages and rods, resulting in a rudder drift in an opposite direction.

These rudder drifts together with resultant directional changes and required corrections are undesirable and are amplified in very sensitive control systems having large yaw authority. Furthermore, fin bending caused by winds or otherwise adds a yaw input in an undesirable direction as the fin is subjected to sideload.

SUMMARY OF THE INVENTION

In accordance with one aspect of the invention, a thermal compensation linkage cancels undesirable input to an airplane's rudder by employing thermal compensation means pivotally connected to the rudder linkage through an intermediate lever. As the fin structure expands or contracts, the thermal compensation means moves the aforementioned lever, rotating it about a fixed pivot point. The lever's opposite end provides a movable fulcrum for a reversing link that is thereby caused to move approximately the same distance as the expansion or contraction of the fin structure. Since the reversing link is operably connected to the rudder linkage, expansion or contraction in the fin is compensated in the input controls to the rudder and the need for in flight correction of airplane trim by the pilot is reduced.

In accordance with another aspect of the invention, the compensation means is located on the same side of the fin structure neutral axis as the rudder control rods and at approximately the same distance from the neutral axis. With this configuration, the compensating means not only compensates for thermal inputs but for inputs due to structural deflections in the fin.

It is accordingly an object of the invention to eliminate the need for in flight corrections of airplane trim by the pilot necessitated by differential thermal expansion in the airplane's fin and rudder control linkage.

It is another object of the invention to compensate for undesirable yaw inputs to the rudder that require in flight trim correction by the pilot and are caused by structural bending of the fin.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
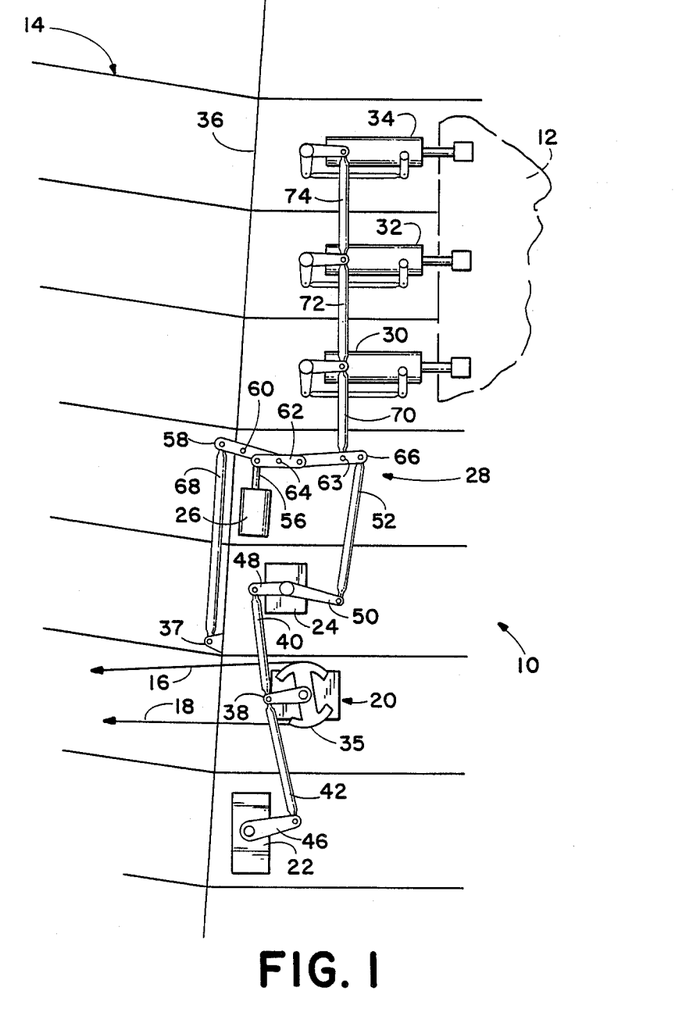
FIG. 1 is a schematic illustration of a rudder control system including a thermal compensation linkage in accordance with the present invention.

Referring to FIG. 1, schematically illustrating a rudder control system 10 for an aircraft, such rudder control system is built into fin 14 and employs various interconnected servos and mechanisms including control cables 16 and 18, rollout guidance servo 22, ratio changer 24, yaw damper servo 26, thermal compensation linkage 28, and rudder power actuators 30, 32, and 34. Control cables 16 and 18 are connected to pilot operated foot pedals and extend to the plane's tail section where each is attached to quadrant 35 mounted in fin 14 aft of fin rear spar 36. Also attached to quadrant 35 is a crank 38 having two nearly vertical connecting rods 40, 42 pivotally connected to its left end. Rod 40 extends upwardly from the crank towards ratio changer 24, while rod 42 connects with arm 46 of rollout guidance servo 22. Rods 40 and 42, like other rods hereinafter discussed, are suitably cylindrical and tapered at their respective ends to engage pivotal means.

As the airplane's pilot depresses the foot pedal connected to cable 16, quadrant 35 and crank 38 rotate in a counterclockwise direction pulling connecting rod 40 downwardly and pushing connecting rod 42 downwardly. If the foot pedal connected to cable 18 is depressed, quadrant 35 and crank 38 rotate in a clockwise direction for bringing about the opposite result. As hereinafter more fully described, the motions of rod 40 are translated to rotation of the airplane rudder, partially shown at 12, via power actuators 30, 32 and 34. Furthermore, feel, trim and centering installation 20 provides a spring resistance against which the pilot can depress the foot pedals and feel the tension increase to provide an indication to the pilot of rudder rotation. Also by way of installation 20 the pilot can correct airplane trim error as may result from differential changes in engine thrust and fuel load.

Rollout guidance servo 22 is mounted in fin 14 aft of fin rear spar 36 and below feel, trim and centering installation 20 and includes a nearly horizontal actuating lever 46 connected to rod 42. Rollout guidance servo 22 actuates lever 46 for rotating the same in a clockwise or counterclock wise sense depending on the direction rudder 12 is to be rotated. Rollout guidance servo 22 serves an autopilot function. For example, once the pilot has positioned the plane relative to a runway, he can engage rollout guidance servo 22 in landing the airplane.

Ratio changer 24 is also mounted in fin 14 aft of fin rear spar 36 but above feel, trim and centering installation 20. Input lever 48 and the interconnected output lever 50 thereof are nearly horizontal, with lever 48 extending to the left and lever 50 extending to the right. Connecting rod 40 is pivoted at its upper end to the left end of lever 48 of ratio changer 24. Nearly vertical control rod 52 is pivotably connected at the right end of lever 50 and extends upwardly towards linkage 28.

As rod 40 is pulled downwardly, levers 48 and 50 are rotated in a counterclockwise direction and as a result, control rod 52 is moved upwardly, or the reverse if levers 48 and 50 turn in a clockwise direction. Either the pilot or rollout guidance servo 22 controls the input to linkage 28.

As its name suggests, ratio changer 24 provides a variable coupling between its input rod 40 and its output rod 52. Apparatus 24 is of a known type being only schematically illustrated herein, and may be viewed as changing the relative lengths of levers 48 and 50 in the plane of the drawing. Lever 50 is relatively lengthened as the airplane's airspeed decreases and shortened as the airplane's airspeed increases. As lever 50 is lengthened in relation to lever 48, the output through control rod 52 is greater than the input through connecting rod 40 and vice versa. The ratio changer 24 operation is responsive to airspeed, via means not shown, and adjusts to prevent too much rudder rotation at high speeds where just a few degrees of rudder rotation can significantly change the direction of the plane in flight, while allowing for greater rudder rotation at lower speeds where a greater degree of rotation is required to achieve desired results.

Yaw damper servo 26, responsive to an electrical sensing device (not shown), is mounted in fin 14 aft of rear spar 36 and is provided with a nearly vertical yaw damper rod 56 extending towards linkage 28. Yaw damper servo 26 compensates for turbulence, to which the pilot may be unable to react, by sensing when the airplane begins to yaw and providing a small corrective rudder input. This small rudder input is combined with other inputs, including the already described input from control rod 52, being coupled via linkage 28 to power actuators 30, 32, and 34.

Figure 2:
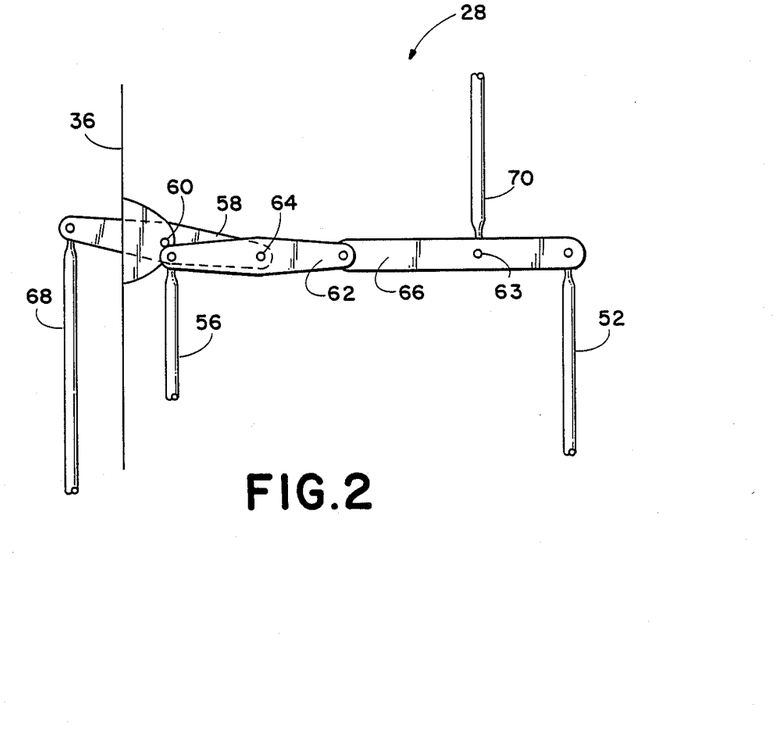
FIG. 2 is a further schematic illustration of a thermal compensation linkage in accordance with the present invention.

Referring to FIGS. 1 and 2, linkage 28 of rudder control system 10 comprises three nearly horizontal elements including a lever 58 having a central fulcrum fixedly attached to fin rear spar 36 at point 60, a reversing link 62 with a central pivot point 64, and a summing link 66 having a fulcrum or adding point 63. The fixed pivot point 60 of lever 58 is attached to fin 14 aft of fin rear spar 36 so that the lever extends through the spar (via an aperture), its left end being on the forward side of the spar while its right end is located aft of the spar. At its right end, lever 58 provides moving pivot point 64 for reversing link 62. To complete the linkage connection, reversing link 62 is pivotally joined at its right end to summing link 66. In addition to receiving input from control rod 52 and yaw damper rod 56, linkage 28 of rudder control system 10 is further actuated by thermal compensation rod 68. Thermal compensation rod 68 is pivotally joined at its lower end to the fin rear spar 36 via bracket 37, and at its upper end is pivotally connected to the left end of lever 58.

Yaw damper input rod 56, extending upwardly from yaw damper servo 26, is connected to the left end of reversing link 62. Finally, control rod 52 extending upwardly from ratio changer 24 is pivotally joined to the right end of summing link 66.

Linkage 28 further comprises three nearly vertical output rods 70, 72, and 74. These output rods may be located as schematically illustrated in FIG. 1 with the lower end of rod 70 coupled to fulcrum 63 of summing link 66, while the upper end of output rod 70 is operatively joined to actuator 30 and rods 72 and 74 are interposed between the actuators 30, 32, and 34. Alternatively each of the rods 70, 72, and 74 can be driven from summing link 66 such that each of their upper ends controls an actuator.

As fin 14 cools during climb of the aircraft and contracts relative to linkage 10, thermal compensation rod 68 urges the left end of lever 58 upwardly rotating it about fixed pivot point 60. Lever 58, providing at its right end the movable pivot point 64 of reversing link 62, moves the reversing link's movable pivot point downwardly about the same distance as the contraction in fin 14 over the length of rod 68, and, assuming that yaw input rod 56 is stationary, the right end of reversing link 62 is moved downwardly approximately twice the distance of the aforementioned contraction in the fin. Consequently, the left end of summing link 66 is also moved downwardly approximately twice the distance of the contraction in fin 14. Rod 52 and the right end of summing link 66 moves relatively upwardly due to the thermal contraction in the fin. Summing link 66 to the left of its fulcrum point 63 is longer than to the right of the fulcrum point, but the downward movement at the left end of link 66 is sufficient to cancel the relatively upward movement of rod 52, as well as additional movement resulting from the expansion of rods 70, 72 and 74, whereby undesirable input to rudder 14 brought about by thermal expansion of the rods 42, 40, 52, 70, 72 and 74 is cancelled.

Furthermore, thermal compensation rod 68 is located on the same side of the neutral axis of fin 16 (the aircraft longitudinal centerline) as control rods 42, 40, 52, 70, 72 and 74 and at approximately the same distance from the neutral axis. With this configuration, compensation rod 68 not only compensates for thermal "inputs" but also for inputs due to structural deflection in fin 16, as hereinafter more fully described. ! In FIGS. 3-6, parts of the thermal compensation linkage are illustrated in greater detail, with corresponding elements indicated by primed reference numerals. Lever 58' of linkage 28' comprises an offset torque tube 76 having three right lever extensions 86 and one left lever extension 88. Supporting offset torque tube 76 are three spaced lower members 84 which are rotatably secured to the spar structure at pivot points provided by pins 60'. The three spaced right lever extensions 86 each include a lower forked channel 87 providing a right pivot 64' for supporting a reversing link 62'. A fail safe spring 89 interconnects the lower end of at least one extension 86 to fin rear spar 36' so that if compensating rod 68 should fail, the remainder of the linkage would be held in a predetermined position.

Left lever extension 88 of lever 58' is disposed in perpendicular relation to torque tube 76 and is positioned downwardly and to the left thereof through gasketed aperture 89 in fin rear spar 36' to provide the left pivot point 80 by means of fastener 82 for interconnection with compensating rod 68. Left lever extension 88 is located approximately three-fourths of the length of torque tube back from the torque tube's forward end as viewed in FIG. 3. Finally, located upwardly and to the left on the lever 58' are two members 90 that are joined to offset torque tube 76 for providing cooperation with corresponding rig pin reference points. Rig pins 83 are employed for installing and adjusting thermal compensation linkage 28' by providing connection to fin rear spar 36' while the rest of thermal compensation linkage 28' is installed. Once the structure is installed, the pins are removed.

Figure 3:
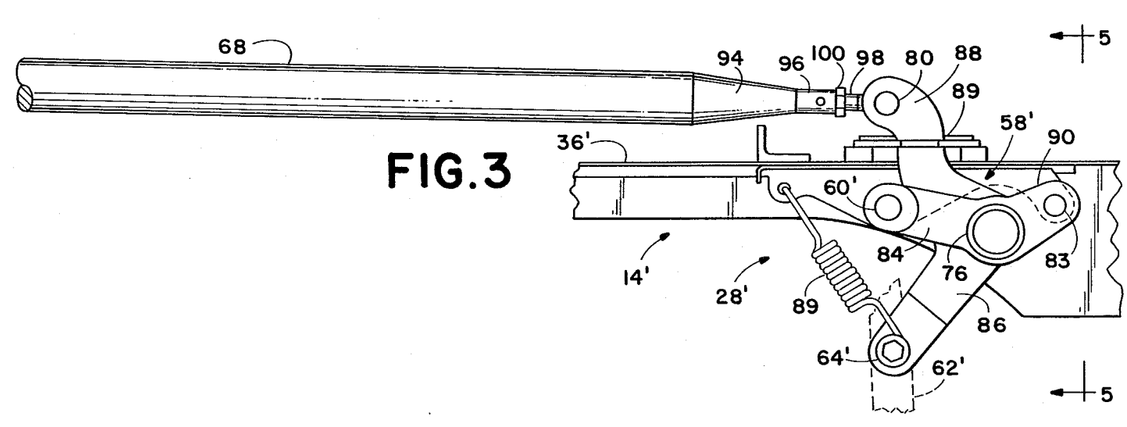
FIG. 3 is a side elevational view, partially broken away, of a thermal compensation linkage in accordance with the present invention.
Figure 4:
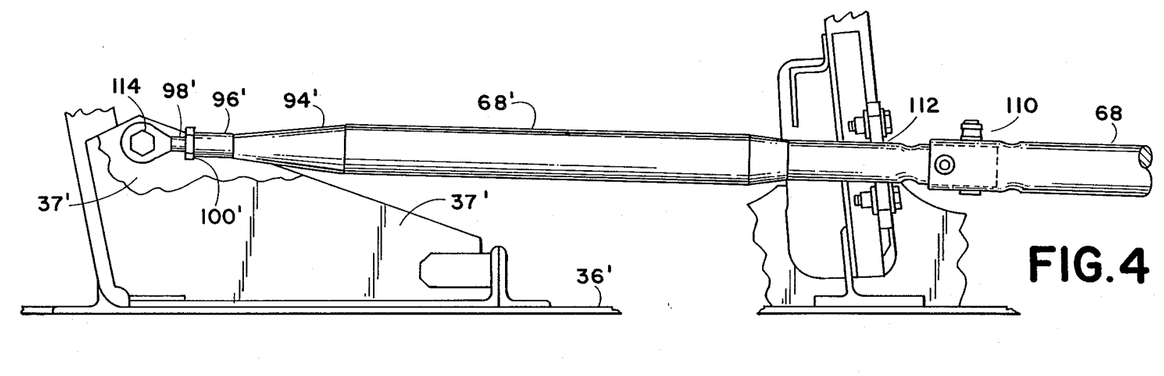
FIG. 4 is a side view of a longitudinal extension, partially broken away, of the FIG. 3 linkage.
Figure 5:
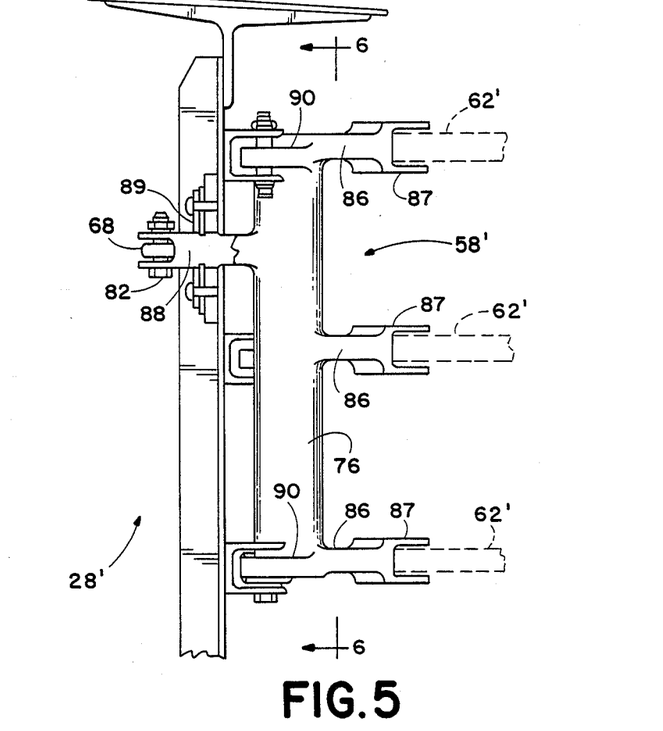
FIG. 5 is a view taken at 5—5 in FIG. 3.
Figure 6:
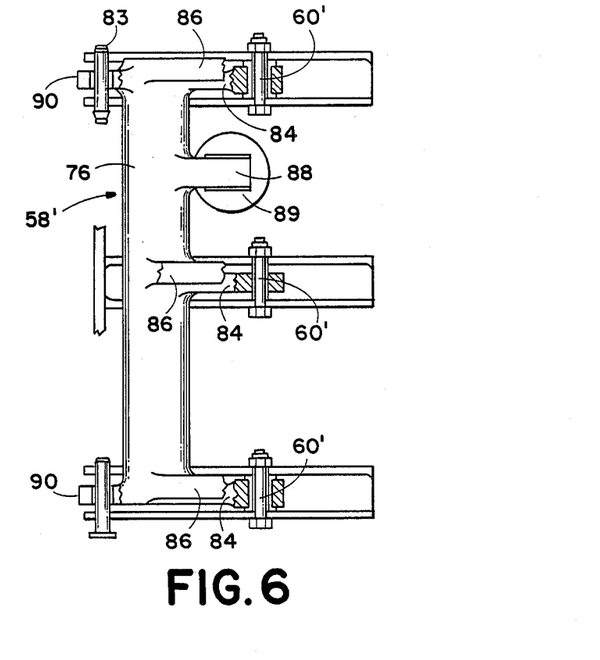
FIG. 6 is a view taken at 6—6 in FIG. 5.

FIGS. 3 and 4 illustrate compensation rod 68' in detail. Where compensation rod 68' approaches left pivot point 80, it tapers at 94 to form neck 96 which receives extender 98 pivotally joined at 80 to lever member 88. Rotatable collar 100 on rod 68' threadably engages extender 98 and is used to adjust the length of the rod 68'. Thermal compensation rod 68' need not extend the entire length of fin 14' to adequately represent the overall expansion of the fin since by selecting appropriate lengths for various levers and links in linkage 28' and by positioning pivot points correctly, a mechanical advantage can be obtained which will adequately represent the overall expansion of the fin relative to rod 68. It is desirable, however, for the rod 68 to extend over a substantial portion of the height of the fin, and, as indicated by FIG. 4, rod 68 is suitably joined to extension 68' thereof by means of fastened joint 110. The extension passes through an aperture 112, acting as a guide to prevent rod 68 from buckling under compression loads, to a lower compartment in the fin where it is pivotally joined by adjustable fastener 114 to bracket 37 attached to spar 36'. Adjustable means 98'-100' at this end of the rod are utilized in the same manner as means 98-100 described above. Rod 68-68' is of similar construction and formed of the same metal material as rods 42, 40, 52, 70, 72 and 74.

At each pivot point 60' for lever 58', a relatively small ball bearing member is provided. It is possible to utilize small bearings at this point, while maintaining the accuracy of angular positioning of the various arms forming part of lever 58', because of the presence of offset torque tube 76. Since the various levers and extensions are joined to offset torque tube 76, the torque resulting from forces acting on the levers and extensions act upon the torque tube and do not produce forces with respect to fixed pivot points 60' as would require larger bearings to produce accurately controlled movement.

Inasmuch as there are three right lever extensions 86 with corresponding channels 87, it will be appreciated there are preferably three corresponding reversing links 62' with movable pivot points 64', each reversing link's movable pivot being provided in a channel 87 of lever 58'. As linkage 28' operates, the left end of each reversing link 62' rotates inside a corresponding channel 87. As further input to linkage 28', there are provided three nearly vertical yaw damper input rods each connected to the left end of a reversing link 62' The structure of FIG. 1 is further duplicated as desired and is thus redundant for the purpose of protecting against failure of any one part of the linkage. Where there are redundancies in the linkage and rods, it may be assumed that identical components work in unison to achieve the desired action which any one of the components alone would achieve, and therefore if one component fails, the others will continue to operate.

Taking into account the above stated redundancy in linkage 28', operation will be seen to be substantially the same as schematically illustrated by FIGS. 1 and 2. In general, assuming rods 68 and 56 are stationary., and rods 52, 70, 72, and 74 are free to move, when control rod 52 is pushed upwardly by ratio changer 24, then lever 58 and link 62 will remain stationary while link 66 rotates in a counterclockwise sense around the left end of link 62 and output rods 70, 72, and 74 will be urged upwardly with corresponding rudder rotation via actuators 30, 32, and 34. If control rod 52 is pulled downwardly, then link 66 will rotate in a clockwise direction with corresponding rudder rotation in the opposite direction. In either case movement of yaw damper rod 56 will rotate reversing lever 62 providing additional input at the left end of summing link 66, the latter being employed, in part, to "sum" the yaw damper input with the control input on rod 52 and provide an adjusted resultant at the lower end of rod 70. Without thermal compensation rod 68 and lever 58, i.e., with pivot point 64 on reversing link 62 attached to the spar structure, differential expansion in the fin and in the control rod 52, and in the other rods and levers of the rudder control system 10, undesirably adds to (or subtracts from) the desired rudder input causing an out-of-trim condition. However, in accordance with the invention, as fin 14 cools during the climb of the airplane and contracts relative to rudder control system 10 which may be warmer due to its location inside the fin and/or the heat given off from power actuators 30, 32, and 34, rod 68 rotates lever 58 to provide the desired compensation. Reviewing this action, lever 58 brings about rotation of the reversing link's movable pivot point and, assuming that yaw input rod 56 is stationary, reversing link 2 rotates in a clockwise direction during climb. Being pivoted to the right end of reversing link 62, the left end of summing link 66 moves downwardly a sufficient distance for applying an input to the summing link 66 for preventing undesired rudder movement. The "summing" link in this case sums the desired input, and the undesired and compensating expansion/contraction forces. Once the plane reaches cruising altitude, rudder control system 10 begins to cool off and contract relative to fin 14, and upon descent the fin warms up before the linkages inside. It will be appreciated the reverse of the above described action will then provide proper compensation. In addition to the undesirable input from thermal expansion and contraction, fin bending due to side pressure thereon, e.g., from air turbulence or the like, can add undesirable input. Compensation rod 68 is located on the same side of the neutral axis of fin 14 as the other control rods of rudder control system 10 and at approximately the same distance away from such neutral axis as the other rods. Then, as fin 14 bends towards the side of its neutral axis wherein the thermal compensation linkage is located, the linkage becomes longer relative to the fin and would tend toward undesired rudder rotation in the absence of the compensation linkage. However, at this time rod 68 pushes lever 58 upwardly causing rotation of lever 58 around its fixed pivot point in the same manner as described with respect to differential thermal contraction during climb. The compensation linkage similarly operates in reverse to compensate for fin structural bending away from the side of the fin where the aforementioned linkage is located, and cancels the undesirable input to the rudder.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for controlling the angular position of the rudder of an airplane wherein said system is subjected to temperature extremes and resultant differential contraction and expansion with change in altitude, comprising:

an aircraft fin structure with respect to which said rudder is positioned, said structure having a neutral axis around which bending may take place, linkage means for receiving directional input and for coupling the same to said rudder, and a compensating member connected between said fin structure and said linkage means so that a component of the expansion of said compensating member relative to said fin structure is applied at said rudder in a direction for compensating for differential movement between said linkage means and said fin structure as a result of temperature change, and positioned with respect to the neutral axis of said fin structure relative to said linkage means so as to provide substantially equal and opposite control effects on said rudder as a result of bending of said fin structure.

2. The system according to claim 1 wherein said linkage means includes a summing link to which said compensating member is linked for effecting dimensional changes within said linkage means.

3. A system for controlling the angular position of the rudder of an airplane wherein said system is subjected to temperature extremes and resultant differential contraction and expansion with change in altitude, comprising:

an aircraft fin structure with respect to which said rudder is positioned, linkage means for receiving directional input and for coupling the same to said rudder, said linkage means comprising a plurality of interconnected members mounted with respect to said fin structure, rudder actuator means operable pursuant to movement of at least one of said members, and a summing link forming part of said linkage means, and a compensating link connected between said fin structure and said summing link, said compensating link being characterized by thermal expansion substantially similar to thermal expansion of said plurality of members, wherein a component of expansion of said compensating link relative to said fin structure as applied at said rudder actuating means is substantially equal and opposite to a component of expansion of said linkage means relative to said fin structure as applied at said rudder actuating means, for compensating undesired yaw input to said rudder resulting from temperature change.

4. The system according to claim 3 wherein said summing link is responsive in a first direction to relative expansion of said linkage means and in a second and substantially opposite direction to relative expansion of said compensating link.

5. The system according to claim 3 wherein said linkage means and said compensating link have major structural components in a direction vertically of said fin structure, and wherein said linkage means and said compensating link are positioned on the same side of the fin structure's neutral axis, whereby structural bending of said fin structure about a horizontal axis results in movement of said linkage means relative to said fin structure and movement of said compensating link relative to said fin structure producing substantially equal and opposite effects at said rudder actuating means to compensate for undesired yaw input to said rudder as result of structural bending of said fin structure by external forces.

6. A control linkage adapted to compensate for differential thermal expansion relative to its support member, said linkage comprising:

a summing link for providing an output and adapted to receive first and second inputs at first and second spaced points therealong, control input means for providing said first input at said first point on said summing link, a reversing link having a movable pivot and connected to provide said second input at said second spaced point on said summing link, a lever having a fixed pivot and providing thereupon the said movable pivot for said reversing link, and a thermal compensation rod operatively connected to said lever for rotating said lever, said thermal compensation rod extending from said support member to rotate said lever and compensate for differential thermal expansion between said linkage and said support member by moving said reversing link and said summing link in a first direction in response to temperature change opposite to the direction of movement relative to said support member by the remainder of said linkage in response to temperature change.

7. A rudder control linkage for controlling an airplane rudder's angular rotation relative to a fin structure, said linkage comprising:

a summing link;

an output rod centrally connected to said summing link;

an input rod connected to said summing link;

a reversing link having a movable pivot, said reversing link being pivotally connected to said summing link;

a yaw damper input rod operatively connected to said reversing link;

a lever having a fixed pivot, said lever supporting said reversing link's movable pivot; and a thermal compensation rod attached to said lever at a point thereon on the opposite side of said fixed pivot from said reversing link's movable pivot, said thermal compensation rod being joined to said fin structure to compensate for error in the angular rotation of said rudder caused by differential thermal expansion in said fin structure and said linkage.

8. A rudder control linkage in accordance with claim 7, wherein said thermal compensation rod is located on the same side and approximately the same distance from said fin structure's neutral axis as said input rod, said yaw damper input rod, and said output rod to compensate for undesired yaw input to said rudder as a result of structural bending of said fin.

9. A rudder control linkage in accordance with claim 7 wherein said lever comprises an offset torque tube spaced from and having an axis parallel to said fixed pivot, said torque tube being provided with plural arms extending therefrom to said compensation rod and to provide said reversing link's movable pivot.

* * * * *

UNITED STATES PATENT AND TRADEMARK OFFICE
CERTIFICATE OF CORRECTION

PATENT NO. : 4,863,122

DATED : September 5, 1989

INVENTOR(S) : PER A. BOLANG ET AL

It is certified that error appears in the above-identified patent and that said Letters Patent is hereby corrected as shown below:

Column 4, line 40, delete the exclamation point (!)

Column 4, line 40, a new paragraph should begin with "In FIGS. 3-6. . ."

Column 6, line 10, a new paragraph should begin with "Without thermal. . ."

Column 6, line 25, "2" should be --62--

Column 8, line 26, "cf" should be --of--.

Signed and Sealed this

Sixth Day of August, 1991

Attest:

HARRY F. MANBECK, JR.

Attesting Officer

Commissioner of Patents and Trademarks